United States Patent
Le Grand et al.

(10) Patent No.: US 10,274,346 B2
(45) Date of Patent: Apr. 30, 2019

(54) DETERMINING QUALITY OF A LOCATION-DETERMINATION ALGORITHM ASSOCIATED WITH A MOBILE DEVICE BY PROCESSING A LOG OF SENSOR DATA

(71) Applicant: Google LLC, Mountain View, CA (US)

(72) Inventors: Etienne Le Grand, Mountain View, CA (US); David Nicholas Christie, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1173 days.

(21) Appl. No.: 14/447,517

(22) Filed: Jul. 30, 2014

(65) Prior Publication Data

US 2016/0033265 A1     Feb. 4, 2016

(51) Int. Cl.
  *G01D 9/00*    (2006.01)
  *G01C 21/16*   (2006.01)
  *G01C 21/32*   (2006.01)

(52) U.S. Cl.
  CPC ............ *G01D 9/00* (2013.01); *G01C 21/16* (2013.01); *G01C 21/32* (2013.01)

(58) Field of Classification Search
  CPC ........................................ G01D 9/00
  USPC ....................................... 702/150
  See application file for complete search history.

(56) References Cited

U.S. PATENT DOCUMENTS

| | | | |
|---|---|---|---|
| 6,947,734 B1 | 9/2005 | Toubassi | |
| 7,733,268 B2 * | 6/2010 | Harper | G01S 19/20 342/357.23 |
| 8,509,761 B2 | 8/2013 | Krinsky et al. | |
| 8,521,429 B2 | 8/2013 | Sundararajan et al. | |
| 2011/0028122 A1 | 2/2011 | Kota et al. | |
| 2013/0225202 A1 | 8/2013 | Shim et al. | |
| 2014/0195149 A1* | 7/2014 | Yang | G01S 5/0252 701/445 |
| 2014/0341465 A1* | 11/2014 | Li | G06K 9/00664 382/160 |
| 2015/0281910 A1* | 10/2015 | Choudhury | G01S 5/021 455/456.1 |
| 2015/0330795 A1* | 11/2015 | Srinivasan | G01C 21/206 701/522 |

* cited by examiner

*Primary Examiner* — Ricky Ngon
(74) *Attorney, Agent, or Firm* — McDonnell Boehnen Hulbert & Berghoff LLP

(57) ABSTRACT

Methods and systems for evaluating the quality of a location-determination algorithm of a mobile device are described. An example method may involve receiving a log of sensor data that may include sensor values output by given sensors of a mobile device over a time period, and at least one location estimate for at least one respective point in time within the time period. One or more processors may then determine, using the sensor values, an estimated trajectory that includes a plurality of computed ground-truth locations of the mobile device over the time period. Further, the method may involve determining a difference between a given location estimate and a computed ground-truth location of the plurality of computed ground-truth locations. And the method may involve providing an output indicative of whether the determined difference satisfies a predetermined threshold.

18 Claims, 8 Drawing Sheets

DETERMINING QUALITY OF A LOCATION-DETERMINATION ALGORITHM ASSOCIATED WITH A MOBILE DEVICE BY PROCESSING A LOG OF SENSOR DATA

BACKGROUND

An increase in the number of mobile devices, such as smartphones, tablets, and wearable computing devices, over the past few years has led to the emergence and development of many mobile location-based services. A few of the most common mobile location-based services include mapping, navigation, and searching for nearby restaurants or stores. Other examples include geo-tagging pictures, sharing current locations with friends, "checking-in" to places on social networks, and receiving location-based deals and promotions.

Given the growing number of mobile devices and the popularity of mobile location-based services, it is therefore not surprising that mobile devices may include different types of positioning systems for determining a geographic location of the mobile device. For example, many mobile devices have an integrated global positioning system (GPS) that is configured to determine the position of a mobile device by precisely timing signals sent by GPS satellites above the Earth. In addition, some mobile devices are also configured to make use of the presence of one or more particular cellular radio towers, wireless access points, and/or Bluetooth transmitters, to estimate the position of the mobile device based on triangulation and/or fingerprinting. Further, some mobile devices are configured to use data collected by sensors (e.g., accelerometers, gyroscopes, magnetometers, etc.) of the mobile device to facilitate location determination. Still further, some mobile devices are configured to fuse data from various sources like GPS, Wi-Fi, cellular radio towers, and sensors of the mobile device to determine a fused location estimate.

Some mobile devices are configured to perform location determination locally in hardware of the mobile device. For example, a mobile device may have a dedicated location processor that is separate from a main application processor of the mobile device and is configured to determine location estimates for the device without waking up the main application processor. On the other hand, some mobile devices are configured to perform location determination using software that is executed by a main application processor of the mobile device, optionally in conjunction with a server in a network.

Each of the different positioning systems has advantages and disadvantages. By way of example, it may be desirable to allow a mobile device to determine location estimates using a location-determination algorithm that is executed by a location processor of the mobile device rather than using a location-determination algorithm that is executed by a main application processor of the mobile device. For instance, a mobile device may conserve power by performing location-determination using the location processor rather than using a main application processor.

SUMMARY

Different mobile device positioning systems may produce location estimates having varying levels of accuracy and reliability. Given the dependence of various location-based services on accurate and reliable location estimates, there may be a need to test the quality of a location-determination algorithm associated with a mobile device before permitting the mobile device to use the location-determination algorithm in conjunction with location-based services provided by an operating system of the mobile device. Described herein are methods and systems for testing the quality of a location-determination algorithm associated with a mobile device by processing a log of sensor data collected by the mobile device.

In one example aspect, a method is provided. The method involves receiving a log of sensor data that includes (i) sensor values output by given sensors of a plurality of sensors of a mobile device over a time period, and (ii) at least one location estimate for at least one respective point in time within the time period. The at least one location estimate is determined by a location-determination algorithm associated with the mobile device. The method also involves determining, by one or more processors and using the sensor values of the log of sensor data, an estimated trajectory of the mobile device for the time period. The estimated trajectory includes a plurality of computed ground-truth locations of the mobile device over the time period. The method further involves determining a difference between a given location estimate of the at least one location estimate and a computed ground-truth location of the plurality of computed ground-truth locations. The given location estimate and the computed ground-truth location both correspond to a substantially same point in time within the time period. Additionally, the method involves providing an output indicative of whether the determined difference satisfies a predetermined threshold.

In another example aspect, a computer-readable medium having stored thereon instructions that, when executed by one or more processors of a computing device, cause the computing device to perform functions is provided. The functions include receiving a log of sensor data. The log of sensor data includes (i) sensor values output by given sensors of a plurality of sensors of a mobile device over a time period, and (ii) at least one location estimate for at least one respective point in time within the time period. The at least one location estimate is determined by a location-determination algorithm associated with the mobile device. The functions also include determining, using the sensor values of the log of sensor data, an estimated trajectory of the mobile device for the time period. The estimated trajectory includes a plurality of computed ground-truth locations of the mobile device over the time period. The functions further include determining a difference between a given location estimate of the at least one location estimate and a computed ground-truth location of the plurality of computed ground-truth locations. The given location estimate and the computed ground-truth location both correspond to a substantially same point in time within the time period. Additionally, the functions include providing an output indicative of whether the determined difference satisfies a predetermined threshold.

In still another example aspect, a system that includes a processor and a computer-readable medium is provided. The computer-readable medium is configured to store instructions, that when executed by the at least one processor, cause the system to perform functions. The functions include receiving a log of sensor data. The log of sensor data includes (i) sensor values output by given sensors of a plurality of sensors of a mobile device over a time period, and (ii) at least one location estimate for at least one respective point in time within the time period. The at least one location estimate is determined by a location-determination algorithm associated with the mobile device. The functions also include determining, using the sensor values of the log of sensor data, an estimated trajectory of the mobile device for the time period. The estimated trajectory includes a plurality of computed ground-truth locations of the mobile device over the time period. The functions further include determining a difference between a given location estimate of the at least one location estimate and a computed ground-truth location of the plurality of computed ground-truth locations. The given location estimate and the computed ground-truth location both correspond to a substantially same point in time within the time period. Additionally, the functions include providing an output indicative of whether the determined difference satisfies a predetermined threshold.

In another example, a system is provided that comprises means for receiving a log of sensor data that includes (i) sensor values output by given sensors of a plurality of sensors of a mobile device over a time period, and (ii) at least one location estimate for at least one respective point in time within the time period. The at least one location estimate is determined by a location-determination algorithm associated with the mobile device. The system also includes means for determining, using the sensor values of the log of sensor data, an estimated trajectory of the mobile device for the time period. The estimated trajectory includes a plurality of computed ground-truth locations of the mobile device over the time period. The system further includes means for determining a difference between a given location estimate of the at least one location estimate and a computed ground-truth location of the plurality of computed ground-truth locations. The given location estimate and the computed ground-truth location both correspond to a substantially same point in time within the time period. Additionally, the system includes means for providing an output indicative of whether the determined difference satisfies a predetermined threshold.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
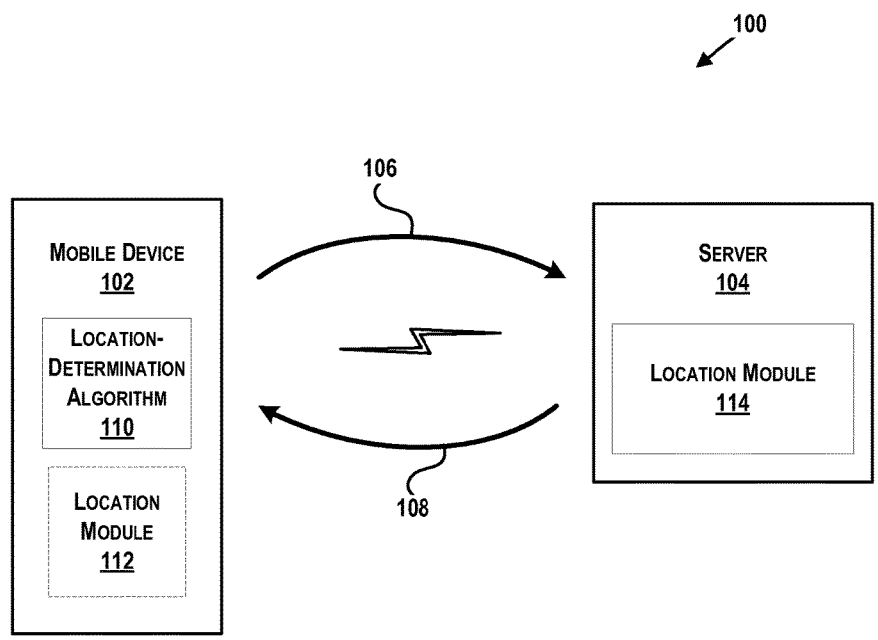
FIG. 1 illustrates an example communication system in which an example method may be implemented.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In some instances, in order to conserve battery power and avoid having to rely exclusively on a location-determination algorithm provided by an operating system running on the mobile device, a mobile device may include additional functionality to facilitate determining a location estimate. For instance, the mobile device may be configured to run a hardware fused location provider (HW FLP) to determine a location estimate for the mobile device. By way of example, the HW FLP may include a set of related software functionalities that are executed by a processor independently of the main application processor. Consequently, the HW FLP may consume less power as compared to the location provider executed by the main application processor, since the HW FLP may provide location estimates without using the power-intensive main application processor.

In some examples, when designing a HW FLP, different mobile device manufacturers and chipset manufacturers may configure HW FLPs to execute different location-determination algorithms, depending on the desired configuration. As a result, different HW FLPs may produce location estimates having varying levels of accuracy and reliability depending on the particular location-determination algorithm utilized by the HW FLP. Given the dependence of various location-based services on accurate and reliable location estimates, there may be a need to test the quality of a location-determination algorithm associated with a mobile device before permitting the mobile device to use the location-determination algorithm (e.g., in conjunction with location-based services provided by an operating system of the mobile device). Accordingly, described herein are methods and systems for testing the quality of a location-determination algorithm associated with a mobile device by processing a log of sensor data collected by the mobile device.

According to an example method, one or more processors may receive a log of sensor data. For instance, the log of sensor data may be a trace of sensor data collected by one or more sensors of a mobile device for a period of time (e.g., one minute, five minutes, etc.). By way of example, the sensor data may include data from one or any combination of a gyroscope, accelerometer, magnetometer, pedometer, barometer, global positioning system (GPS) receiver, Wi-Fi sensor, cellular radio communication component, Bluetooth sensor, or other type of sensor. In addition to the sensor values output by given sensors of the mobile device, the log of sensor data may further include at least one location estimate for a respective point in time within the time period. For instance, the at least one location estimate may have been determined by the mobile device using a location-determination algorithm associated with the mobile device. As one example, the at least one location estimate may have been determined using a HW FLP of the mobile device.

As part of the example method, the one or more processors may then determine an estimated trajectory of the mobile device for the time period using the sensor values. In practice, the estimated trajectory may include a plurality of computed ground-truth locations of the mobile device for the time period. As described herein, the one or more processors may determine the estimated trajectory using a variety of techniques. For instance, the one or more processors may use a simultaneous localization and mapping (SLAM) algorithm that has access to more data than the location-determination algorithm of the mobile device to estimate the location of the mobile device for the time period. Alternatively, the one or more processors may localize, using the sensor values of the log of sensor data, a position of the mobile device within a known map. As another example, the one or more processors may determine an estimated trajectory by using a GPS-based location estimate and additional sensor values as inputs to a dead reckoning algorithm.

Additionally, the one or more processors may then compare the estimated trajectory to the at least one location estimate provided within the log of sensor data. By way of example, the one or more processors may determine a difference between a given location estimate and a computed ground-truth location that both correspond to a substantially same point in time within the time period. As used herein, the term substantially same point in time may refer to instances in time that occur within a predetermined range of time (e.g., half of a second, one second, or multiple seconds) of one another. Thus, the given location estimate may correspond to a first instance in time, and the computed ground-truth location may correspond to a second instance in time that occurs within a predetermined range of time of (e.g., before or after) the first instance in time.

In practice, the determined difference may be a geographic distance, such as a distance between two geographic position coordinates. Alternatively, the determined difference may be an angular measurement, such as a difference between two headings. In some instances, the one or more processors may determine another difference between another location estimate and another computed ground-truth location. In this scenario, the one or more processors may average the first distance and the additional distance such that the determined distance is an average difference.

Further, the one or more processors may then provide an output indicative of whether the determined difference satisfies a predetermined threshold. As one example, the output may indicate whether the determined difference is less than a distance threshold (e.g., one meter, multiple meters, etc.). In some instances, based on the output, the one or more processors may enable or disable use of the location-determination algorithm in conjunction with location-based services. For instance, in response to determining that the difference does not satisfy the predetermined threshold, the one or more processors may cause the mobile device to use a preferred software algorithm for location-determination rather than using the location-determination algorithm associated with the mobile device. Alternatively, in response to determining that the difference does satisfy the predetermined threshold, the one or more processors may enable the mobile device to use the location-determination algorithm associated with the mobile device rather than the preferred software algorithm. Thus, the described method may allow one or more processors of a computing device to test the quality of a location-determination algorithm associated with the mobile device, and in some instances, allow the computing device to enable a mobile device to use the location-determination algorithm with various location-based services.

In some examples, the one or more processors may include one or more processors of a computing device that is communication with the mobile device via a network. For instance, the computing device may be a server. In other examples, the one or more processors may include one or more processors of the mobile device that collects the log of sensor data. Thus, throughout the disclosure, in examples in which both a computing device and a mobile device are provided, the computing device may be the mobile device. Alternatively, the computing device may be a separate device that receives the log of sensor data from the mobile device.

The described method may be preferable to other techniques for evaluating the quality of location-determination algorithms since, in some examples, the method does not require collection of a ground-truth data set or visiting test locations. For instance, one approach to testing the quality of a location-determination algorithm involves collecting sensor values by visiting a physical location such that the ground-truth data set and corresponding locations are known. A computing device may then provide the sensor values to the mobile device so that the mobile device can use the sensor values as inputs to a location-determination algorithm during a simulation, and report the outputs of the simulation to the computing device. The computing device can then compare the outputs of the simulation with the ground-truth locations to evaluate the quality of the location-determination algorithm. This approach encourages overfitting to the test data, and does not necessarily test lower hardware layers of the location-determination algorithm for bugs since the mobile device does not have to actually visit the location to perform the simulation.

Another approach to evaluating the quality of a location-determination algorithm involves having mobile device manufacturers or engineers that develop location-determination algorithms visit predetermined test locations to perform tests. For instance, a test user may take a mobile device to a test location and follow a predetermined path for which the ground-truth location is known. In one example, the test location may have a visual map that is used to save the ground-truth location of the path. The manufacturer may then report the results of the test to an engineer or other user who evaluates the quality of the location-determination algorithm. This approach requires test users to travel to physical locations, and also relies on trusting the accuracy reported by the test user, who may have an interest in biasing the test results.

Although portions of this disclosure are described with respect to location-determination algorithms that are determined based on GPS data or wireless access points, for example, the examples are not meant to be limiting. The methods and systems described are applicable to locations estimates that are determined using any system or technique. Various other functionalities of the systems and methods discussed above are also described hereinafter with reference to the accompanying figures.

Referring now to the figures, FIG. 1 illustrates an example communication system 100 in which an example method may be implemented. In FIG. 1, a mobile device 102 may communicate with a server 104 via one or more wired and/or wireless interfaces. The mobile device 102 and the server may communicate within a network. Alternatively, the mobile device 102 and the server 104 may each reside within a respective network.

The mobile device 102 may be any type of computing device including a laptop computer, a mobile telephone, tablet computer, wearable computer, etc., that is configured to carry out the method and computing device functions described herein. In some examples, the mobile device may be configured to transmit data 106 to or receive data 108 from the server 104 in accordance with the method and functions described herein. The mobile device may include a location-determination algorithm 110 which may be configured to determine a location estimate for the mobile device. For instance, the location-determination algorithm may be a HW FLP that is designed to fuse data from various sources like GPS, Wi-Fi, cellular radio towers, sensors, Bluetooth, etc. to provide a location estimate. The mobile device 102 may also include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

In some examples, the mobile device 102 may include a location module 112 which may be configured to process data collected by the mobile device 102 to determine an estimated trajectory of the mobile device 102.

The server 104 may be any entity or computing device arranged to carry out the method and computing device functions described herein. Further, the server 104 may be configured to send data 108 to or receive data 106 from the mobile device 102. The server 104 may include a location module 114 which may be configured to process the data 106 received from the mobile device 102 to determine an estimated trajectory of the mobile device 102.

The data 106 received by the server 104 from the mobile device 102 may take various forms. For example, the mobile device 102 may collect a log of sensor data that includes sensor values output by given sensors of a plurality of sensors of the mobile device over a time period. Further, the data 106 may include at least one location estimate determined by the location-determination algorithm 110 for at least one point in time within the time period.

The data 108 sent to the mobile device 102 from the server 104 may take various forms. For example, the server 104 may send to the mobile device 102 instructions that cause the mobile device 102 to collect a log of sensor data. As another example, the server 104 may send to the mobile device 102 instructions that enable the mobile device 102 to use the location-determination algorithm 110 or cause the mobile device to use a preferred software algorithm rather than the location-determination algorithm 110.

Figure 2:
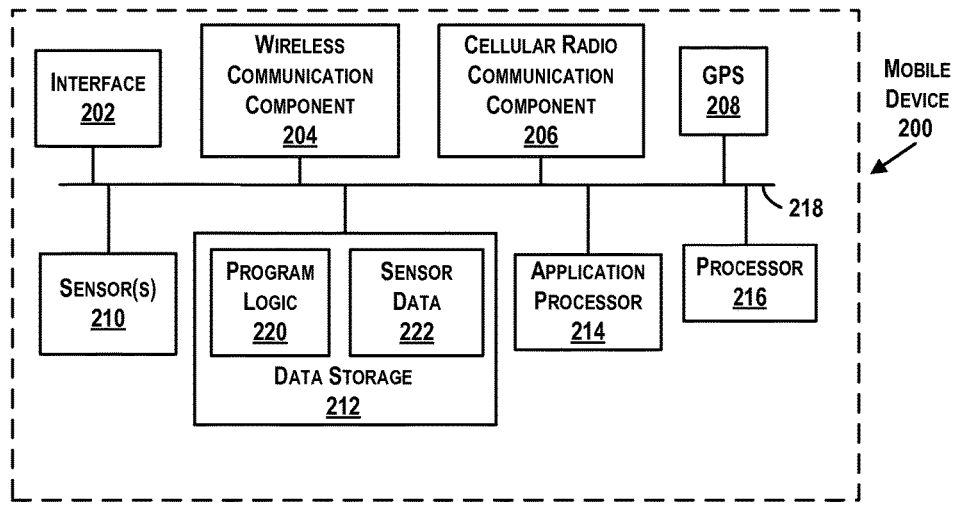
FIG. 2 illustrates a schematic drawing of an example mobile device.

FIG. 2 illustrates a schematic drawing of an example mobile device 200. In some examples, some components illustrated in FIG. 2 may be distributed across multiple computing devices. However, for the sake of example, the components are shown and described as port of one example mobile device 200. The mobile device 200 may be or include a mobile phone, robotic device, wearable computer, tablet computer, laptop computer, email/messaging device, or similar device that may be configured to perform the functions described herein.

In some implementations, the mobile device 200 may include a device platform (not shown), which may be configured as a multi-layered Linux platform. The device platform may include different applications and an application framework, as well as various kernels, libraries, and runtime entities. In other examples, other formats may operate the mobile device 200 as well.

The mobile device 200 may include an interface 202, a wireless communication component 204, a cellular radio communication component 206, a GPS receiver 208, sensor(s) 210, data storage 212, application processor 214, and an additional processor 216. Components illustrated in FIG. 2 may be linked together by a communication link 218. The mobile device may also include hardware to enable communication within the mobile device 200 and between the mobile device 200 and another computing device (not shown), such as a server entity. The hardware may include transmitters, receivers, and antennas, for example.

The interface 202 may be configured to allow the mobile device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the mobile device 200. In other examples, records of data may be maintained and managed by other components of the mobile device 200. The interface 202 may also include a user-interface, such as a keyboard, microphone, touchscreen, etc., to receive inputs as well.

The wireless communication component 204 may be a communication interface that is configured to facilitate wireless data communication for the mobile device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The sensor 210 may include one or more sensors, or may represent one or more sensors included within the mobile device 200. Example sensors include an accelerometer, gyroscope, magnetometer, barometer, pedometer, light sensors, microphone, camera, or other location and/or context-aware sensors. Note that the wireless communication component 204, cellular radio communication component 206, and GPS receiver 208 may each also be considered sensors for purposes of the example methods and computing device functions described herein.

The application processor 214 and/or the processor 216 may be configured to determine one or more geographical location estimates of the mobile device using one or more location-determination components, such as the wireless communication component 204, the cellular radio communication component 206, the GPS receiver 208, or the sensor 210. For instance, the application processor 214 or the processor 216 may use a location-determination algorithm to determine a location of the mobile device 200 based on a presence and/or location of one or more known wireless access points within a wireless range of the mobile device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the mobile device 200 may be determined.

In another instance, the application processor 214 or the processor 216 may use a location-determination algorithm to determine a location of the mobile device based on nearby cellular radio towers (e.g., base stations). For example, the cellular radio communication component 206 may be configured to at least identify a cell from which the mobile device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the mobile device 200.

In still another example, the application processor 214 or the processor 216 may use a location-determination algorithm to determine a location of the mobile device 200 based on signals sent by GPS satellites above the Earth. For example, the GPS receiver 208 may be configured to estimate a location of the mobile device by precisely timing signals sent by the GPS satellites.

In some examples, the application processor 214 or the processor 216 may use a location-determination algorithm that combines location estimates determined by multiple location-determination components, such as a combination of the wireless communication component 204, the cellular radio communication component 206, the GPS receiver 208, and any of the sensors 210. Further, the application processor 214 or the processor 216 may determine a location of the mobile device by communicating with another computing device, e.g., a server. For instance, the application processor 214 or the processor 216 may provide data to a server for processing, and receive from the server a location estimate. Alternatively, the application processor 214 or the processor 216 may provide data to a server for processing, and receive from the server processed data that facilitates location determination. Thus, the location-determination may occur in conjunction with a server in a network.

The data storage 212 may store program logic 220 that can be accessed and executed by the processor 214 or processor 216. The data storage 212 may also store collected sensor data 222 that may include data collected and/or determined by any of the wireless communication component 204, the cellular radio communication component 206, the GPS receiver 208, and any of the sensors 210.

In line with the discussion above, the processor 216 may be configured to determine location estimates independently of the main application processor. For instance, the processor 216 may execute instructions to provide a FLP. By way of example, the FLP may be a service that runs independently of any application program and is designed to fuse data from various sources like GPS satellites, wireless access points, cellular radio towers, or one or more of the sensors 210, etc., to provide a location estimate. In one example, the FLP may be a HW FLP that is executed by hardware of the mobile device (e.g., the processor 216) without waking up the application processor 214.

The communication link 218 is illustrated as a wired connection; however, wireless connections may also be used. For example, the communication link 218 may be a wired serial bus such as a universal serial bus or a parallel bus, or a wireless connection using, e.g., short-range wireless radio technology, communications protocols described in IEEE 802.11 (including any IEEE 802.11 revisions), or cellular technology, among other possibilities.

Figure 3:
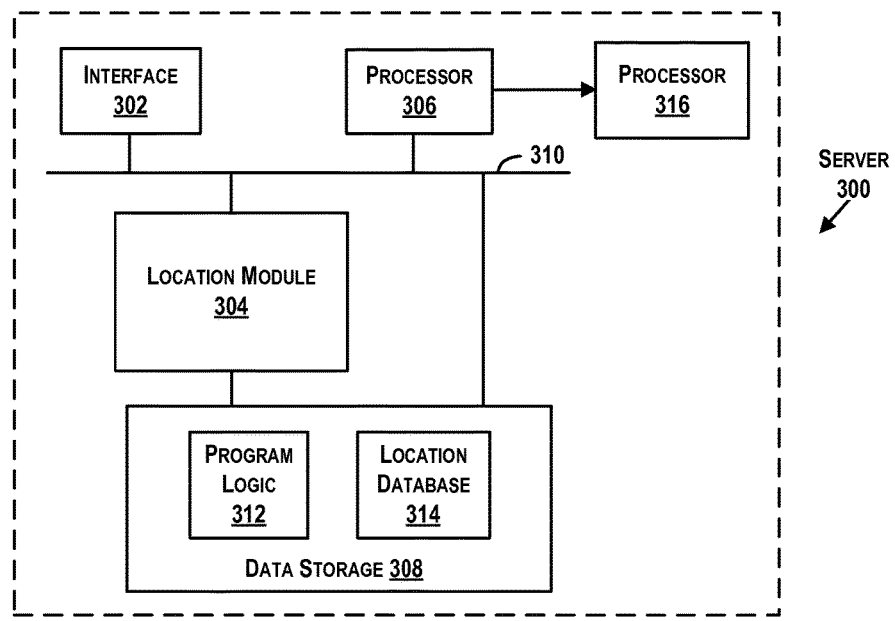
FIG. 3 illustrates a schematic drawing of an example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile device or other type of computing device. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a mobile device and determine an estimated trajectory of the mobile device. For instance, the location module 304 may determine one or more computed ground-truth locations of the mobile device using a log of sensor data received from the mobile device.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a mobile device.

The server is illustrated with a second processor 316 which may be an application specific processor for input/output functionality. In other examples, functions of the processor 306 and the processor 316 may be combined into one component.

Within examples, mobile device 200 or server 300 may perform one or more functions related to determining a quality of a location-determination algorithm associated with a mobile device. As discussed above, although portions of the description of FIGS. 4-9 refer to both a computing device and a mobile device, in some examples, the computing device and the mobile device may be the same actual device. Alternatively, the computing device a separate device that receives a log of sensor data from the mobile device.

Figure 4:
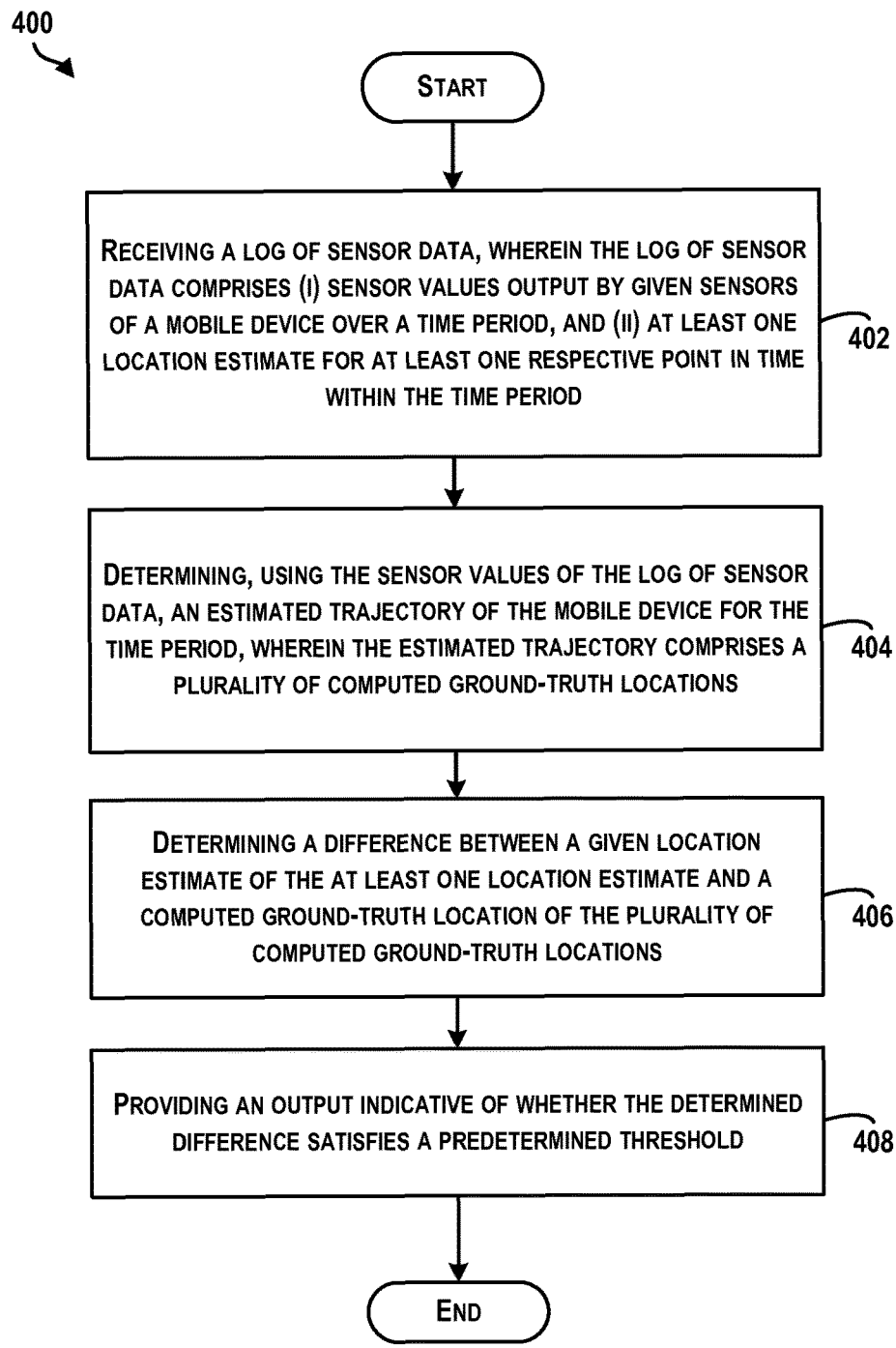
FIG. 4 is a block diagram of an example method for determining a quality of a location-determination algorithm.

FIG. 4 is a block diagram of an example method 400 for determining a quality of a location-determination algorithm. Method 400 shown in FIG. 4 presents an embodiment of a method that could be used or implemented by the mobile device 102 or server 104 of FIG. 1, or the mobile device 200 or server 300 of FIG. 3, or by components of the mobile device 102, the server 104, the mobile device 200, or the server 300. More generally, method 400 presents an embodiment of a method that could be used or implemented by any computing device, or a group of computing devices. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes receiving a log of sensor data. The log of sensor data may include sensor values output by given sensors of a mobile device over a time period. By way of example, the log of sensor data may include sensor values output by one or any combination of an accelerometer, gyroscope, magnetometer, GPS receiver, Wi-Fi sensor, Bluetooth sensor, barometer, pedometer, or other sensor of a mobile device. In some instances, the sensor values may be time stamped. For example, an individual sensor value may include a time stamp indicating when the sensor value was observed or determined.

In some instances, the sensor data may include sensor values collected or determined at fixed intervals (e.g., every second, every five seconds) and/or random, non-periodic intervals. The time period may range from short time periods spanning a few seconds (e.g., ten seconds) to longer time periods spanning a number of minutes (e.g., one minute, five minutes, etc.). In some examples, the log of sensor data may include sensor values corresponding to multiple different time periods (e.g., a first thirty second time period as well as a second thirty second time period occurring an hour later).

Further, the log of sensor data may include at least one location estimate for at least one respective point in time within the time period. The at least one location estimate may be determined by a location-determination algorithm associated with the mobile device. As one example, the location-determination algorithm may include a HW FLP of the mobile device that is configured to output a location estimate without using a main application processor of the mobile device. For instance, the location-determination algorithm may include a HW FLP of the mobile device that is configured to determine a location estimate using a processor of the mobile device that is separate from a main application processor of the mobile device. Additionally, the at least one location estimate may include a time stamp indicating when the location estimate was determined.

In practice, the HW FLP of the mobile device may determine the at least one location estimate using any number of location-determination techniques. As one example, the at least one location estimate may be estimated GPS position coordinates determined using a GPS receiver. Optionally, the location estimate may also indicate an orientation of the mobile device. As another example, the at least one location estimate may be a geographic position that is determined using data from a Wi-Fi sensor of the mobile device or a Bluetooth sensor of the mobile device. In other instances, the HW FLP of the mobile device may combine data from multiple sensors of the mobile device (e.g., data from a GPS receiver and a Wi-Fi sensor, data from a GPS receiver, an accelerometer, and a gyroscope) to determine the at least one location estimate.

Further, in some instances, the location-determination algorithm associated with the mobile device may determine the location estimate by communicating with a location server. For instance, a location processor of the mobile device may send sensor data to the location server, and the location server may return processed data or an estimated location estimate to the mobile device. Thus, the method 400 is not limited to location estimates that are determined exclusively by the mobile device.

In some examples, the log of sensor data may include data collected by the mobile device while a user of the mobile device is walking, biking, running, or riding in a vehicle. In one example, the log of sensor data may include data collected by the mobile device while the mobile device is transitioning from an indoor environment to an outdoor environment. For instance, the log of sensor data may include indoor location data that does not include any GPS data as well as outdoor location data that includes at least one GPS estimate.

At block 404, the method 400 includes determining, using the sensor values of the log of sensor data, an estimated trajectory of the mobile device for the time period. The estimated trajectory may include a plurality of computed ground-truth locations of the mobile device over the time period. By way of example, each of the computed ground-truth locations may include a geographic position coordinate (e.g., latitude and longitude) as well as a heading of the mobile device.

In practice, a computing device may determine the estimated trajectory using any of variety of location-determination techniques. As one example, the computing device may determine a path of the mobile device using dead reckoning. Dead reckoning determination may be used to determine an estimate of a given position of the mobile device based on a previous position of the mobile device, an estimated speed over an elapsed time, and a direction of travel of the mobile device. Therefore, if a log of sensor data includes at least one GPS location estimate as well as gyroscope and accelerometer data before and/or after the time of the GPS location estimate, dead reckoning may be used to advance or backtrack the position of the mobile device.

In some instances, the computing device may determine a speed using a known or estimated distance traveled (as derived or calculated from outputs of a pedometer, outputs of an accelerometer inferring a step has been taken, or other senor data) and an elapsed time. The direction of travel may be derived from data received from a gyroscope or magnetometer, for instance. Alternatively, the direction of travel may be determined by fusing accelerometer, gyroscope, and optionally magnetometer data, for example. In other examples, other available information can be used to provide further estimates (directly or indirectly) as to direction of travel, including Wi-Fi scans that may indicate information as to position and heading of the mobile device.

The dead reckoning calculation can then be performed to determine an estimation of the current position of the mobile device. As an example, accelerometer data can be used as a pedometer and magnetometer data can be used as a compass heading provider. Each step of a user of the mobile device may cause a position to move forward a fixed distance in a direction measured by the compass. Accuracy may be limited by precision of the sensors, magnetic disturbances inside structures of the computing device, and unknown variables such as carrying position of the mobile device and stride length of the user. However, the estimate of the current position can be determined in this manner.

In one instance, the path determined based on the dead reckoning determination can be aligned to one or more GPS estimates so as to provide a relative path of the mobile device mapped to a position coordinate(s).

In another example, the computing device may determine the estimated trajectory by using the sensor values of the log of sensor data as inputs to a SLAM algorithm. Within examples, the SLAM optimization may include performing a GraphSLAM optimization, however, other SLAM algorithms may also be used. SLAM algorithms are state estimation algorithms in which a state (localization of traces and characteristics of maps) is determined by maximizing its likelihood. The likelihood comes from a set of constraints, which are indicated by data within the log of sensor data. Because the state can lie in a space of high dimension (e.g., hundreds of thousands of dimensions), finding a global optimum may be difficult. GraphSLAM uses a nonlinear least squares solver designed to find local optimum. It may find the global optimum if a state initialization was close enough to it. Additional data, such as existing partial maps and sensor data from other mobile devices can also be used during the execution of the SLAM algorithm.

In one instance, the log of sensor data may be processed in an iterative manner so as to use accurate data first followed by data considered to have a lower confidence. For example, a log of sensor data may include GPS data and Wi-Fi sensor data. Further, the log of sensor data may include a first portion corresponding to a first time period that includes GPS data and a second portion corresponding to a second time period that does not include GPS data. As part of a SLAM optimization, the first portion of the log of sensor data may be selected for processing and aligned with a relative path that comes from dead reckoning calculations. The alignment may provide a good guess as to where the mobile device was when each Wi-Fi scan in that sensor log occurred, and thus, the Wi-Fi scans may be used to build an initial Wi-Fi signal strength map with estimated access point (AP) positions. In this example, trajectories of the device are considered known and kept constant while AP positions are optimized using a non-linear optimization. After that, the AP positions have a good starting point, and so a SLAM optimization can be performed on all selected data in which neither the AP position nor the trajectory is held constant.

A second iteration may then be performed with the second portion of the log of sensor data. For example, the initial Wi-Fi map may be used to estimate absolute location of the device during the second portion using the Wi-Fi scans even though there is no GPS data. A similar process is performed to calculate a dead reckoning path for the second portion, and then find the optimal trajectory using the Wi-Fi scans. Wi-Fi AP positions are held constant in the initial map since the trajectory based on the second portion may initially be unknown. Once the second portion has a decent estimate (using the Wi-Fi scans, GPS, dead reckoning and fixed AP positions), a SLAM optimization can be performed where the Wi-Fi map is no longer held constant and everything can be jointly optimized (including the first portion and the AP positions).

In another example, the computing device may determine the estimated trajectory by localizing, using the sensor values of the log, a position of the mobile device over time within a known map. For instance, the computing device may compare Wi-Fi signal strength measurements to a map of Wi-Fi signal strength measurements to localize the position of the mobile device at multiple points in time.

The computing device may use other location-determination techniques to determine the trajectory as well. Further, the computing device may use additional data to compute the ground-truth locations as well. By way of example, the computing device may use sensor data from other mobile devices, such as sensor data collected by other mobile devices while located near or at the location where the mobile device collected the log of sensor data.

At block 406, the method 400 includes determining a difference between a given location estimate of the at least one location estimate and a computed ground-truth location of the plurality of computed ground-truth locations. The given location estimate and the computed ground-truth location may both correspond to a substantially same point in time within the time period. For instance, the given location estimate may correspond to a first time t, and the computed ground-truth location may correspond to a second time t+1 that is one second after the time t. In some examples, each location estimate of the log of sensor data may be compared to a computed ground-truth location that occurs closest in time to the location estimate.

In some instances, the determined difference may be a geographic distance by which a single location estimate and a computed ground-truth location differ. Alternatively, if the log of sensor data includes multiple location estimates, the computing device may determine a respective difference for each of the multiple location estimates, and then derive an average distance. For instance, the respective distance for each location estimate may be a geographic distance to a computed ground-truth location that occurs closest in time to the location estimate.

In other examples, the determined difference may be a difference in orientation by which a location estimate and a computed ground-truth location differ, or an average difference in orientation by which multiple location estimates differ from corresponding computed ground-truth location estimates. For instance, the difference in orientation may be a number of degrees by which a first heading and a second heading disagree.

At block 408, the method 400 includes providing an output indicative of whether the determined difference satisfies a predetermined threshold. By way of example, the predetermined threshold may be a distance threshold or an orientation threshold, and the output may be a binary indication of whether or not the determined difference satisfies the predetermined threshold. For instance, if the distance threshold is two meters, the output may indicate whether or not the determined difference is less than two meters. Or if the orientation threshold is forty-five degrees, the output may indicate whether or not the determined difference is less than forty-five degrees.

In another example, the output may be more detailed. For instance, the output may include an indication of the estimated trajectory of the mobile device for the time period and an indication of the at least one location estimate for the at least one respective point in time within the time period.

In some instances, the predetermined threshold may be an adaptive or dynamic threshold. For example, the predetermined threshold may change based on the observed performance of other location-determination algorithms associated with other mobile devices. In other words, if the computing device determines that one, or perhaps multiple mobile devices, has been able to determine location estimates that are within a particular distance or orientation of a computed ground-truth location, the computing device may determine the predetermined threshold based on the particular distance or orientation.

In a further example, the method 400 may also include causing the mobile device to collect data when a computing device observes that the mobile device is near a particular location or in a particular geographic area. For example, in one scenario, the mobile device may provide location estimates to the computing device from time-to-time (e.g., once every ten minutes, once every hour or few hours). The computing device may then analyze the location estimates to determine if the mobile device is currently located within a predetermined distance of one of a plurality of predetermined geographic test locations, or to determine if the mobile device is currently located within one of a plurality of predetermined geographic areas. For instance, if a received location estimate indicates the mobile device is within one mile of a geographic test location, the computing device may cause the mobile device to begin to collect a log of sensor data (e.g., a thirty-second log, a two-minute log, etc.). Similarly, if a received location estimate indicates that the mobile device is within a predetermined geographic area, the computing device may cause the mobile device to begin to collect a log of sensor data. In some instances, after collecting the log of sensor data, the mobile device may wait until connecting to a wireless network and/or power source before providing the log of sensor data to the computing device.

Additionally, in some examples, the method 400 may also include enabling or disabling use of the location-determination algorithm associated with the mobile device. For instance, in one scenario, in response to determining that the difference does not satisfy the predetermined threshold, a computing device may cause the mobile device to use a preferred software algorithm for location-determination rather than using the location-determination algorithm associated with the mobile device. Although the preferred software algorithm may involve using a main application processor to communicate with a server and may therefore consume more power, this may be preferable to allowing the mobile device to use a more power-efficient but less accurate and reliable location-determination algorithm. Accordingly, the computing device may send instructions to the mobile device to use the preferred software algorithm rather than the location-determination algorithm associated with the mobile device.

Similarly, in response to determining that the difference does satisfy the threshold, the computing device may enable the mobile device to use the location-determination algorithm associated with the mobile device rather than a preferred software algorithm for location determination. In one scenario, the mobile device may, by default, be configured to use the preferred software algorithm. However, once the computing device has evaluated the quality of the location-determination algorithm associated with the mobile device, the computing device may send an instruction to the mobile device authorizing the mobile device to instead use the preferred software algorithm.

Figure 5:
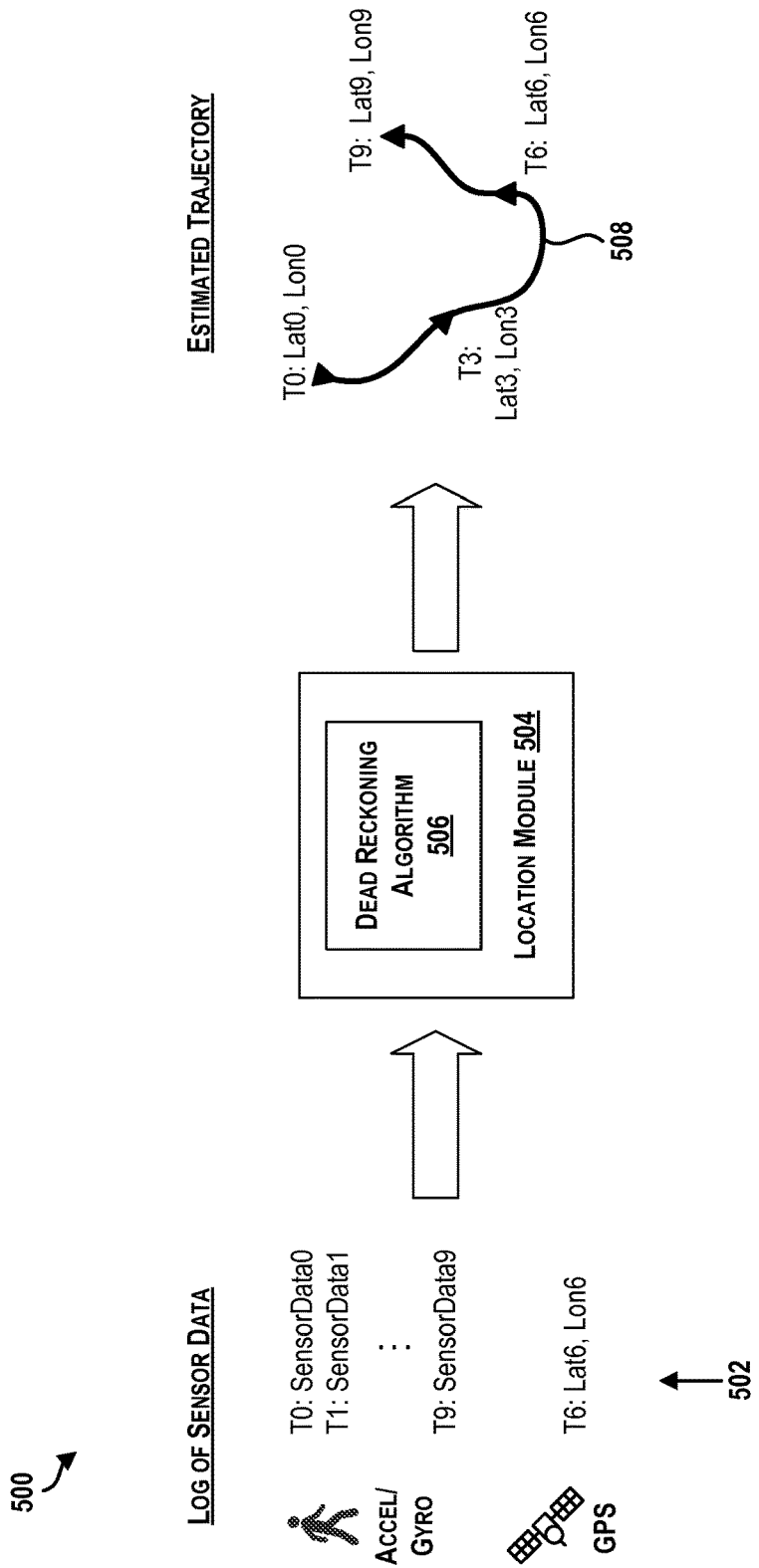
FIG. 5 is a flow diagram illustrating an example method for determining an estimated trajectory of a mobile device.

Referring now to FIG. 5, FIG. 5 is a flow diagram illustrating an example method 500 for determining an estimated trajectory of a mobile device. As depicted conceptually in FIG. 5, a computing device may receive a log of sensor data 502 that includes a plurality of accelerometer and gyroscope sensor values and a single GPS estimate. For purposes of illustration, the accelerometer and gyroscope sensor values are depicted as corresponding to ten different times, T0-T9, within a time period, while the single GPS estimate is depicted as corresponding to time T6. In practice, the accelerometer and gyroscope data may be collected in a near-continuous flow (e.g., at 100 Hz or another frequency). Thus, the log of sensor data may include many more accelerometer and gyroscope values, and the example is not meant to be limiting. Further, a location module 504 of the computing device may then be configured to execute a dead reckoning algorithm 506. Using the log of sensor data 502 as inputs to the dead reckoning algorithm 506, the location module 504 may determine an estimated trajectory 508 that includes four computed-ground truth locations. For instance, the estimated trajectory 508 may include a starting location at time T0, a second location at time T3, a third location at time T6, and an ending location at time T9. Note that the third location at time T6 may be the same location as the GPS estimate from the log of sensor data. Thus, the location module 504 may use the dead reckoning algorithm 506 to determine a computed ground-truth location after time T6 (i.e., at time T9) as well as two computed ground-truth locations before time T6 (i.e., at time T0 and time T3).

Figure 6:
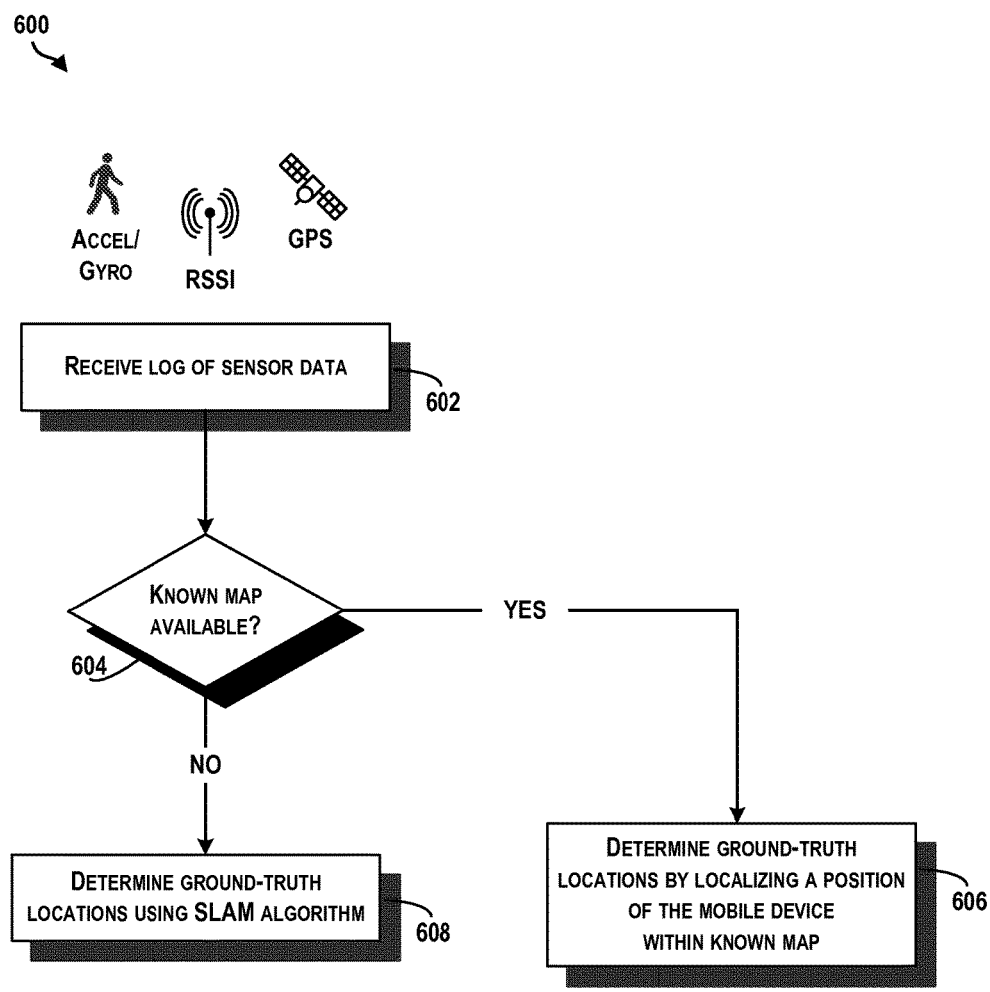
FIG. 6 is a flow diagram illustrating another example method for determining an estimated trajectory of a mobile device.

Within examples, depending on whether a computing device has access to a known map of an environment, the computing device may use a particular location-determination algorithm to determine an estimated trajectory. FIG. 6 is a flow diagram illustrating another example method 600 for determining an estimated trajectory of a mobile device. As shown in FIG. 6, at block 602, the computing device may receive a log of sensor data, and at block 604, the computing device may determine whether a known map corresponding to an environment of the mobile device is available. For instance, if the log of sensor data identifies one or more identities of wireless access points, the computing device may compare the identities to a database of maps to determine whether the database includes a signal strength map for the particular wireless access points.

If the computing device determines that a signal strength map exists for the particular wireless access points, at block 606, the computing device may determine a plurality of ground-truth locations for the mobile device by localizing a position of the mobile device within the known map at various points in time. Alternatively, if the computing device does not have access to a signal strength map for the particular wireless access points, at block 608, the computing device may determine a plurality of ground-truth locations by using the sensor values of the log of sensor data as inputs to a SLAM algorithm.

Figure 7:
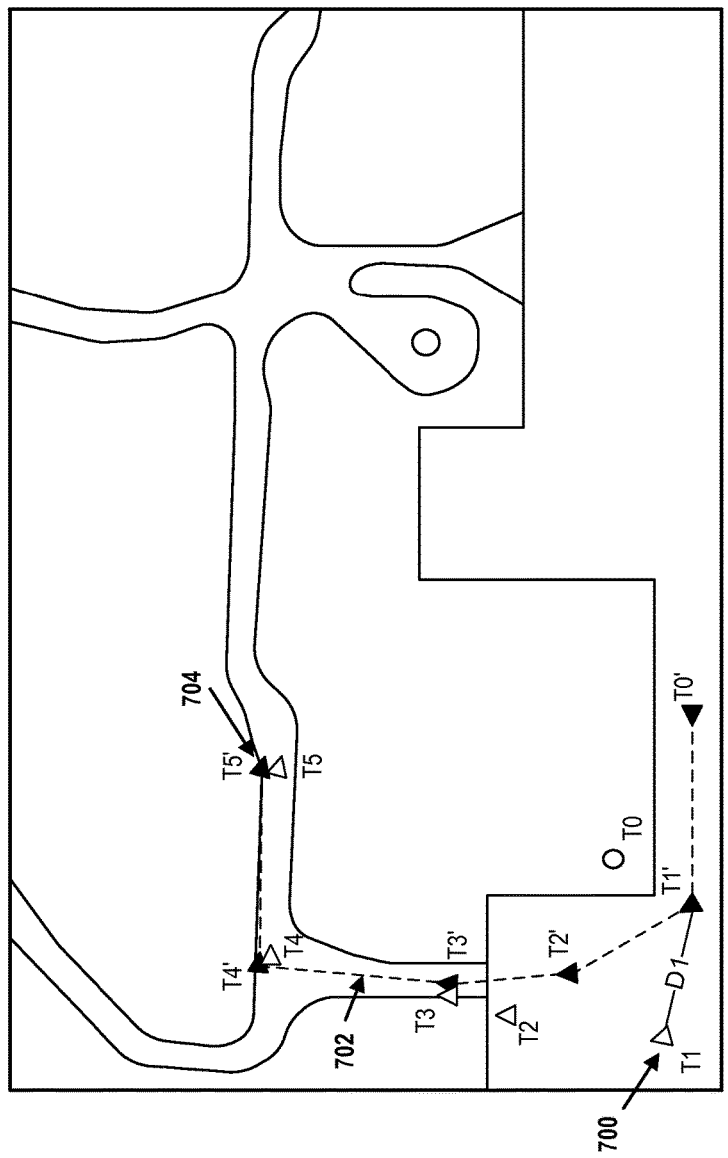
FIG. 7 is a conceptual illustration of an example comparison between a given location estimate and a computed ground-truth location.

In line with the discussion above, a computing device may compare at least one location estimate within a log of sensor data to at least one computed ground-truth location to test the quality of a location-determination algorithm. FIG. 7 is a conceptual illustration of an example comparison between a given location estimate and a computed ground-truth location. Specifically, FIG. 7 depicts the locations of a plurality of location estimates 700 on a map. For instance, the location estimates 700 include five location estimates determined by a mobile device at times T1, T2, T3, T4, and T5. Each location estimate 700 is shown by a white triangle. Further, FIG. 7 depicts an estimated trajectory 702 that is made up of a plurality of computed ground-truth locations 704. In particular, the estimated trajectory 702 includes five computed ground-truth locations for times T1', T2', T3', T4', and T5'. Each computed ground-truth location 704 is shown by a black triangle. Note that in practice, an estimated trajectory may include more or less ground-truth locations than the number of location estimates provided within a log of sensor data.

Given the location estimates 700 and the estimated trajectory 702, a computing device may compute a difference between at least one location estimate and a corresponding computed ground-truth location. By way of example, the computing device may compute a geographic distance D1 between location estimate T1 and computed ground-truth location T1'. Additionally, the computing device may compute additional geographic distances between other location estimates and corresponding computed ground-truth locations. For instance, the computing device may compute a geographic distance between location estimate T2 and computed ground-truth location T2', location estimate T3 and computed ground-truth location T3', and so forth (not shown).

Alternatively or additionally, the computing device may compare the heading of at least one location estimate to at least one corresponding computed ground-truth location. For instance, in FIG. 7, the orientation of each triangle is indicative of the estimated or computed heading of the mobile device. Thus, as an example, the computing device may compare the heading of location estimate T1 to the heading of ground-truth location T1' to determine a difference in heading.

Figure 8:
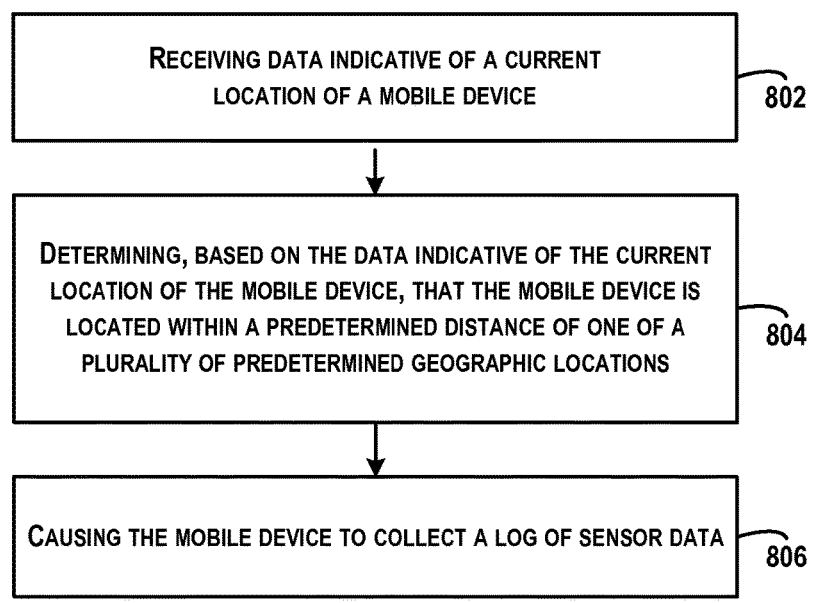
FIG. 8 is a block diagram of additional example functions that may be performed by a computing device.

Further in line with the discussion above, in some examples, a computing device may trigger a mobile device to collect a log of sensor data. Accordingly, FIG. 8 is a block diagram of additional functions that may be performed by a computing device. As shown in FIG. 8, at block 802, a computing device may receive data indicative of a current location of a mobile device. As an example, the data may be a GPS estimate. At block 804, the computing device may determine, based on the data indicative of the current location of the mobile device, that the mobile device is located within a predetermined distance of one of a plurality of predetermined geographic locations. For instance, the computing device may compare a GPS estimate to a plurality of predetermined GPS position coordinates to determine whether the GPS estimate is within one mile of any of the predetermined GPS position coordinates. Alternatively, at block 804, the computing device may determine, based on the data indicative of the current location of the mobile device, that the mobile device is located in one of a plurality of predetermined geographic areas (not shown). And at block 806, the computing device may cause the mobile device to collect a log of sensor data. For instance, the computing device may send an instruction to the mobile device that causes the mobile device to collect a log of sensor data the next time that the mobile device detects that a user of the mobile device is walking, biking, running, or riding in a vehicle.

Figure 9:
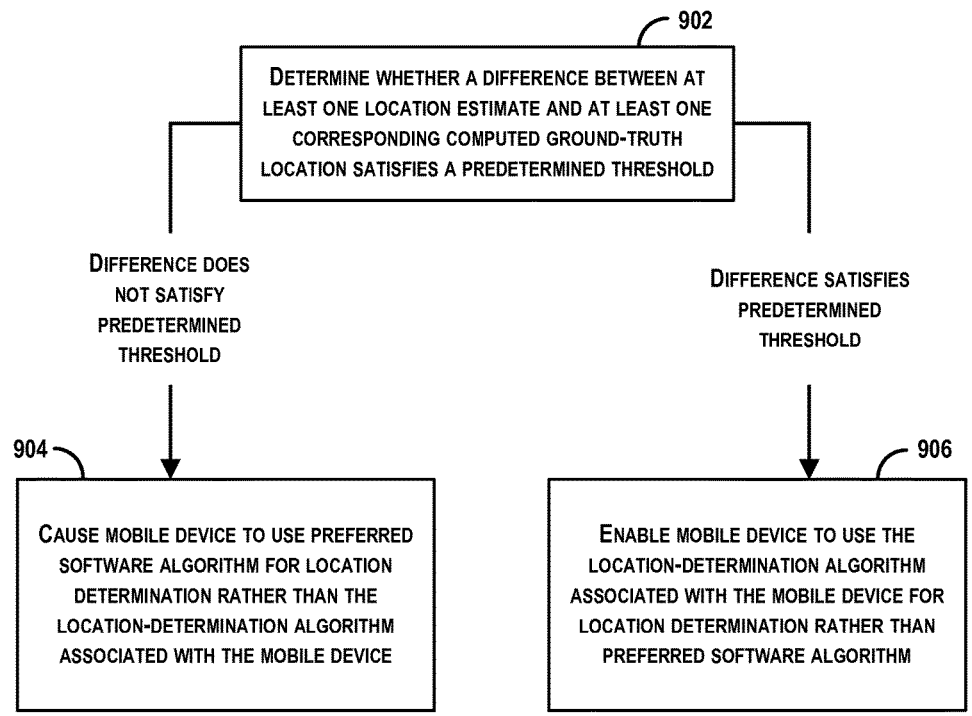
FIG. 9 is a block diagram of additional example functions that may be performed by a computing device.

Further in line with the discussion above, based on the determined quality of a location-determination algorithm, a computing device may perform particular functions. Accordingly, FIG. 9 is a block diagram of additional functions that may be performed by a computing device. As shown in FIG. 9, at block 902, the computing device may determine whether a difference between at least one location estimate and at least one corresponding computed ground-truth location satisfies a predetermined threshold. As discussed above, the computing device may determine a difference in location or heading between a given location estimate and a ground-truth location that both correspond to a substantially same point in time.

If the difference does not satisfy the predetermined threshold, then at block 904, the computing device may cause the mobile device to use a preferred software algorithm for location-determination rather than the location-determination algorithm associated with the mobile device. On the other hand, if the difference does satisfy the predetermined threshold, then at block 906, the computing device may enable the mobile device to use the location-determination algorithm associated with the mobile device for location determination rather than the preferred software algorithm.

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving a log of sensor data, wherein the log of sensor data comprises (i) sensor values output by given sensors of a plurality of sensors of a mobile device over a time period, and (ii) at least one location estimate for at least one respective point in time within the time period, wherein the at least one location estimate is determined by a hardware location provider of the mobile device, and wherein the at least one location estimate is determined while use of the hardware location provider on the mobile device in conjunction with location-based services is disabled but use of another location provider in conjunction with location-based services is enabled;
determining, by one or more processors and using the sensor values of the log of sensor data, a plurality of computed ground-truth locations of the mobile device over the time period, the plurality of computed ground-truth locations of the mobile device forming an estimated trajectory of the mobile device for the time period;
determining a difference between a given location estimate of the at least one location estimate and a computed ground-truth location of the plurality of computed ground-truth locations, wherein the given location estimate corresponds to a first point in time and the computed ground-truth location corresponds to a second point in time that is within a predetermined range of time of the first point in time;
determining whether the determined difference satisfies a predetermined threshold; and
upon determining that the determined difference satisfies the predetermined threshold, enabling use of the hardware location provider by the mobile device in conjunction with location-based services instead of or in addition to use of the other location provider.

2. The method of claim 1, wherein the plurality of sensors comprises at least two sensors selected from the group consisting of: an accelerometer, a gyroscope, a magnetometer, a global positioning system (GPS) receiver, a Wi-Fi sensor, a Bluetooth sensor, a barometer, and a pedometer.

3. The method of claim 1, wherein determining the plurality of computed ground-truth locations comprises determining a path of the mobile device for the time period using at least one GPS-based location estimate and additional sensor values output by at least one sensor of the plurality of sensors as inputs to a dead reckoning algorithm, wherein the dead reckoning algorithm uses the at least one GPS-based location estimate as a starting point and advances or backtracks a position of the mobile device using the additional sensor values.

4. The method of claim 1, further comprising determining the plurality of computed ground-truth locations using the sensor values of the log of sensor data as inputs to a simultaneous localization and mapping algorithm.

5. The method of claim 1, further comprising determining the plurality of computed ground-truth locations by localizing, using the sensor values of the log of sensor data, a position of the mobile device within a known map.

6. The method of claim 1, wherein the hardware location provider is configured to output a location estimate without using a main application processor of the mobile device.

7. The method of claim 1, wherein the other location provider is configured to output a location estimate using a main application processor of the mobile device.

8. The method of claim 1, wherein the log of sensor data comprises a log of sensor data collected by the mobile device while the mobile device is transitioning from an indoor environment to an outdoor environment.

9. The method of claim 1, wherein the other location provider is a preferred software algorithm for location determination.

10. The method of claim 1, further comprising:
receiving data indicative of a current location of the mobile device;
determining, based on the data indicative of the current location of the mobile device, that the mobile device is located within a predetermined distance of one of a plurality of predetermined geographic locations; and
causing the mobile device to collect the log of sensor data.

11. The method of claim 1, wherein the one or more processors comprise one or more processors of the mobile device.

12. The method of claim 1, wherein the one or more processors comprise one or more processors of a computing device that is configured to receive the log of sensor data from the mobile device.

13. The method of claim 1, wherein enabling use of the hardware location provider by the mobile device comprises sending an instruction to the mobile device authorizing the mobile device to use the hardware location provider in conjunction with the location-based services.

14. A non-transitory computer-readable medium having stored therein instructions, that when executed by one or more processors of a computing device, cause the computing device to perform functions comprising:
receiving a log of sensor data, wherein the log of sensor data comprises (i) sensor values output by given sensors of a plurality of sensors of a mobile device over a time period, and (ii) at least one location estimate for at least one respective point in time within the time period, wherein the at least one location estimate is determined by a hardware location provider of the mobile device while use of the hardware location provider on the mobile device in conjunction with location-based services is disabled but use of another location provider in conjunction with location-based services is enabled;
determining, using the sensor values of the log of sensor data, a plurality of computed ground-truth locations of the mobile device over the time period, the plurality of computed ground-truth locations of the mobile device forming an estimated trajectory of the mobile device for the time period;
determining a difference between a given location estimate of the at least one location estimate and a computed ground-truth location of the plurality of computed ground-truth locations, wherein the given location estimate corresponds to a first point in time and the computed ground-truth location corresponds to a second point in time that is within a predetermined range of time of the first point in time;
determining whether the determined difference satisfies a predetermined threshold; and
upon determining that the determined difference satisfies the predetermined threshold, enabling use of the hardware location provider by the mobile device in conjunction with location-based services instead of or in addition to use of the other location provider.

15. The non-transitory computer-readable medium of claim 14, further comprising determining the plurality of computed ground-truth locations using the sensor values of the log of sensor data as inputs to a simultaneous localization and mapping algorithm.

16. The non-transitory computer-readable medium of claim 14, wherein the hardware location provider is configured to output a location estimate without using a main application processor of the mobile device.

17. A system comprising:
    at least one processor; and
    a computer-readable medium, configured to store instructions, that when executed by the at least one processor, cause the system to perform functions comprising:
        receiving a log of sensor data, wherein the log of sensor data comprises (i) sensor values output by given sensors of a plurality of sensors of a mobile device over a time period, and (ii) at least one location estimate for at least one respective point in time within the time period, wherein the at least one location estimate is determined by a hardware location provider of the mobile device while use of the hardware location provider on the mobile device in conjunction with location-based services is disabled but use of another location provider in conjunction with location-based services is enabled,
        determining, using the sensor values of the log of sensor data, a plurality of computed ground-truth locations of the mobile device over the time period, the plurality of computed ground-truth locations of the mobile device forming an estimated trajectory of the mobile device for the time period,
        determining a difference between a given location estimate of the at least one location estimate and a computed ground-truth location of the plurality of computed ground-truth locations, wherein the given location estimate corresponds to a first point in time and the computed ground-truth location corresponds to a second point in time that is within a predetermined range of time of the first point in time,
        determining whether the determined difference satisfies a predetermined threshold, and
        upon determining that the determined difference satisfies the predetermined threshold, enabling use of the hardware location provider by the mobile device in conjunction with location-based services instead of or in addition to use of the other location provider.

18. The system of claim 17, further comprising determining the plurality of computed ground-truth locations using the sensor values of the log of sensor data as inputs to a simultaneous localization and mapping algorithm.

* * * * *